(12) United States Patent
Krishnamoorthy et al.

(10) Patent No.: US 10,776,753 B1
(45) Date of Patent: Sep. 15, 2020

(54) CONSISTENT UPDATING OF DATA STORAGE UNITS USING TENANT SPECIFIC UPDATE POLICIES

(71) Applicant: XACTLY CORPORATION, San Jose, CA (US)

(72) Inventors: Vasudev Krishnamoorthy, San Jose, CA (US); Tony Wang, San Jose, CA (US); Denis Gefter, San Francisco, CA (US); Ron Rasmussen, San Jose, CA (US)

(73) Assignee: XACTLY CORPORATION, San Jose, CA (US)

( * ) Notice: Subject to any disclaimer, the term of this patent is extended or adjusted under 35 U.S.C. 154(b) by 790 days.

(21) Appl. No.: 14/177,121

(22) Filed: Feb. 10, 2014

(51) Int. Cl.
*G06Q 10/10* (2012.01)
*G06Q 50/18* (2012.01)

(52) U.S. Cl.
CPC ............ *G06Q 10/10* (2013.01); *G06Q 50/18* (2013.01)

(58) Field of Classification Search
None
See application file for complete search history.

(56) References Cited

U.S. PATENT DOCUMENTS

| 6,434,631 | B1 * | 8/2002 | Bruno et al. ................... 710/6 |
| 2004/0243600 | A1 * | 12/2004 | Ikeda et al. ................. 707/100 |
| 2006/0059303 | A1 * | 3/2006 | Takeda et al. ................. 711/113 |
| 2007/0038884 | A1 * | 2/2007 | Campbell ........... G06F 11/1464 714/4.11 |
| 2010/0274772 | A1 * | 10/2010 | Samuels ..................... 707/693 |

OTHER PUBLICATIONS

IBM, "IBM Terminology—terms A", http://www-01.ibm.com/software/globalization/terminology/a.html, available Jan. 16, 2015.*
IBM, "IBM Terminology—terms B",http://www-01.ibm.com/software/globalization/terminology/b.html#x2266419, available Jan. 16, 2015.*

(Continued)

*Primary Examiner* — Paul R Fisher
(74) *Attorney, Agent, or Firm* — Hickman Palermo Becker Bingham LLP

(57) ABSTRACT

Updating a data storage unit using tenant specific update policies is disclosed. In an embodiment, a plurality of application events from an events publisher is received at a data pipeline manager. The plurality of application events are associated with data at a source data storage unit and are stored at a data pipeline data storage unit. An update process is initiated, based on an update policy associated with a particular tenant. During the update process, one or more application events associated with the particular tenant are selected from among the plurality of application events stored at the data pipeline data storage unit. Data associated with the one or more selected application events is selected from the source data storage unit. Data selected from the source data storage unit is stored at a target data storage unit. By applying the update policy, for the particular tenant, target data of the particular tenant at the target data storage unit in combination with event data of the one or more application events is continually consistent with source data of the particular tenant at the source data storage unit.

18 Claims, 5 Drawing Sheets

(56) References Cited

OTHER PUBLICATIONS

John Linn et al., "Architectural Principles for Secure Multi-Tenancy", DIMACS Workshop in Systems and Networking Advances in Cloud Computing, Dec. 2011 (Year: 2011).*

David Shue et al. "Performance Isolation and Fairness for Multi-Tenant Cloud Storage", 10th USENIX Symposium on Operating Systems Design and Implementation Sep. 2012 (Year: 2012).*

* cited by examiner

CONSISTENT UPDATING OF DATA STORAGE UNITS USING TENANT SPECIFIC UPDATE POLICIES

TECHNICAL FIELD

The present disclosure generally relates to updating a data storage unit. The disclosure relates more specifically to techniques for updating a target data storage unit with data available on a source data storage unit.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The rise in hardware and software support costs has given way to a new technology delivery model in which an application service provider hosts applications coupled to data storage units on networked devices that are owned by the application service provider. The application service provider's customers, typically business enterprises, connect to the hosted applications via a web browser and enter data via the applications with the expectation that the data entered will be available on-demand whenever needed. The customers typically access the data for various data mining or data aggregation operations required to perform various analytics, such as determining particular trends related to their enterprise's operations. The application service provider rarely has advanced notice of when a customer may request access to its data; therefore, data entered by customers must be available at all times. Consequently, the application service provider must ensure that data entered by customers is always recorded and stored, and that customers may access that data, on-demand, for later consumption.

To fulfill their responsibility, the application service provider typically has a set of source data storage units coupled to their applications that record and store data from customers. Furthermore, for efficiency and cost benefit purposes, application service providers typically maintain and use a multitenant architecture. A multitenant architecture uses a single set of data integrity rules or schema to store data for all their customers or "tenants". The application service provider then updates a separate set of target data storage units with data from the source data storage units. A customer connects to the target data storage units as one means by which the customer may access its data stored with the application service provider. Thus, the application service provider must update data available in the target data storage units in as near real-time as possible to ensure that data available in the target data storage units reflects data in the source data storage units. The application service provider must also ensure that data in the target data storage units is consistent with source data storage units.

Several existing processes, such as extract, transform, and load (ETL), are available to the application service provider to update target data storage units. However, these existing processes usually are incapable of providing variable levels of control, including fine control, over copying data per customer, in a multi-tenant architecture, at an interval that is independent with respect to another customer. The inability to provide such fine-grained control may force inefficient resource allocation by the application service provider and prevents the application service provider from updating target data storage units, per customer, in near real-time. Lack of such fine-grained control also fails the application service provider from ensuring that data per customer is also consistent across source data storage unit and target data storage unit in an efficient manner. Thus, the inability to update target data storage units, on a per customer basis, while ensuring data consistency across source and target data storage units may significantly reduce the value of the service provided by the application service provider.

Therefore, the data management field has developed a long-felt but unfulfilled need for an approach that provides control over copying data at an independent per customer interval.

DESCRIPTION OF EXAMPLE EMBODIMENTS

Figure 1:
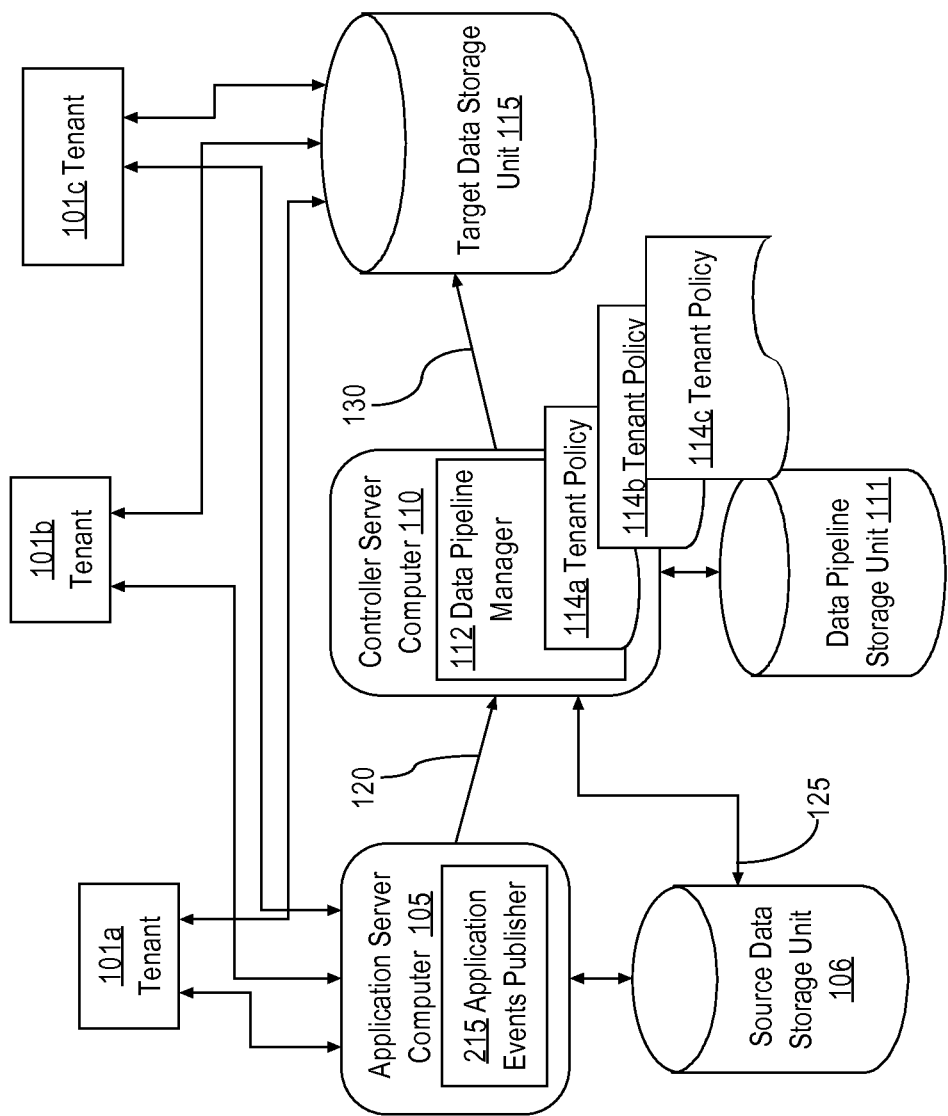
FIG. 1 illustrates an example arrangement of updating a data storage unit using tenant specific update policies.

Consistent updating of data storage units using tenant specific update policies is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0 Overview
2.0 Structural and Functional Overview
3.0 Method of Updating a Data storage unit Using Tenant Specific Update Policies
4.0 Implementation Mechanisms—Hardware Overview
5.0 Extensions and Alternatives
1.0 Overview In an embodiment, a method is described for updating a secondary data storage unit with data from a primary data storage unit. In an embodiment, a plurality of application events, generated by interactions with an application and associated with data stored at a data storage unit coupled with the application, are received at a data controller unit. The plurality of application events received at the data controller unit is stored at a data storage unit coupled with the data controller unit. An update process for a particular tenant is initiated, based on an update policy associated with the particular tenant or on-demand. One or more application events, associated with the particular tenant, are selected from the plurality of application events stored at the data storage unit coupled with the data controller unit. Data associated with the one or more selected application events are selected from the data storage unit coupled with the application. Data selected from the source data storage unit coupled with the application is stored at a target data storage unit. The tenants using the application may access data at either the target data storage unit or source data storage unit.

In other embodiments, the invention encompasses a computer apparatus and a computer-readable medium configured to carry out the foregoing steps.

2.0 Structural and Functional Overview

Certain embodiments help reduce or eliminate inefficiencies caused by data update processes that are incapable of providing fine-grained control over copying data per customer at a frequency that has been configured for that particular customer. In an embodiment, by utilizing a per customer update policy and an intelligent data controller, and/or period (time) based chunking mechanism, fine-grained control over copying data per customer and maintaining data consistency between source and target data storage units may be achieved in near real-time. The implementation of the above embodiment may also be applicable in a multitenant software-as-a-service (SAAS) environment, where the two data storage units may be part of the SAAS environment and may have significantly different performance characteristics. For example, one data storage unit may be a low latency, high volume, high concurrent transactional system, while the other is a low commodity file system hardware.

For purposes of illustrating a clear example, assume that an application service provider has numerous customers or tenants. In a multitenant software-as-a-service (SAAS) environment, the application service provider hosts an application on its application server. The application is coupled to a source data storage unit and uses a single schema for all its customers. The source data storage unit may be a low latency, high volume, high concurrent transactional system. To ensure the source data storage unit is always available to store data entered via the application, the application service provider may desire to limit the workload on the source data storage unit. The application service provider may limit the workload on the source data storage unit by preventing access to the source data storage unit for resource-intensive operations such as data mining or data aggregation. For querying data for data mining or data aggregation purposes, the application service provider may deploy a second data storage unit or target data storage unit, whose primary function is to store and provide access to all data entered by a particular tenant at any time that particular tenant wishes to access such data or some subset of such data. The target data storage unit may be a high latency, low commodity file system hardware. To ensure that data entered by a particular tenant is available for consumption as soon as possible, the application service provider may also desire to update the target data storage unit in near real time. Therefore, efficiency in updating target data storage units and ensuring data consistency across source and target data storage units may be important.

In an embodiment, the application service provider may configure a logical unit such as an application events publisher to capture application events generated by certain interactions with the application hosted by the application service provider. The application events may indicate the particular tenant generating the application events. The application events are not events generated by a particular data storage unit such as a database. Rather, the application events correspond to certain actions performed using the application. For example, if the application is used to capture information about sales made by sales representatives, then the application may generate an "order" event or an "upload" event when a particular sales representative records information related to a particular sales order using the application. Thus, application events as described herein relate to a substantive business application or a business process or procedure rather than elements of infrastructure such as storage or processors. In some embodiments, the application events may be coarse grained events that represent finer grained object events which, in turn, represent changes to data records in the storage unit coupled with the application.

The application events publisher may be configured to forward the captured application events to another logical unit termed a data pipeline controller. The data pipeline controller may be configured with one or more update policies, where each update policy is associated with a particular tenant of the application service provider. Each update policy may define a particular frequency at which an update process is initiated for the particular tenant. In an embodiment, the update process may comprise of translating the coarse grained application events into finer grained object events and selecting data, affected by the object events and associated with the particular tenant, from the source data storage unit and storing the data in the target data storage unit and efficiently update target data storage unit in near real time.

The update policy may also be defined to help ensure data consistency between source and target data storage units. The update policy may be defined to not initiate an update process for the particular tenant if a prior update process of the particular tenant is in progress. Consequently, based on the refresh schedule, data of the particular tenant is consistently preserved, because data of the particular tenant in the target data storage unit combined with data represented by the application events of the particular tenant in the data pipeline controller will be equivalent to data of the particular tenant in the source storage unit. Therefore, data consistency between source and target data storage units is maintained in near real time updates of a target data storage unit.

The update policy may also help with the efficiency of updating a target data storage unit because the update process of a particular tenant may be initiated in parallel with update process of another tenant. Therefore, a first tenant with a large amount data that needs to be updated will never starve out or hold out a second tenant from accessing its data in near real time.

Thus, each update process is associated with a particular single tenant, and each update process is independent from an update process associated with any other tenant because each update process is initiated by its own update policy. The update policies specify control operations for the data pipeline controller and govern operation of the data pipeline controller.

Using this approach, the application service provider may achieve fine-grained control over when data for a particular tenant in the target data storage unit is updated, and may determine the frequency of update processes based upon various factors such as how frequently a particular tenant uses the particular application hosted by the application service provider, or how important a particular tenant may be for the application service provider. Such fine-grained control may enable the application service provider to ensure that data entered by a particular tenant is available for future operations in target data storage unit in near real-time and consistent with source data storage unit.

The foregoing approaches, structures and functions are described further herein in connection with FIG. 1 and the other drawings. FIG. 1 illustrates an example arrangement of updating a data storage unit using tenant specific update policies. A data storage unit, in this context, may be any electronic digital data recording device configured to store data according to a set of rules and in any format, such as a flat file, a database, a data mart, a data warehouse or other storage units.

FIG. 1 depicts a networked computer system comprising an application server computer 105, controller server computer 110, source data storage unit 106, data pipeline storage unit 111, target data storage unit 115, and a plurality of tenants 101a, 101b, 101c. In this example, application server computer 105 is capable of executing procedures, such as programs, routines, scripts or other computer executable commands, for supporting a particular application hosted by the application server. Typically the application is a business application; an example is Xactly Incent, commercially available from Xactly Corporation, San Jose, Calif. In some embodiments, application server computer 105 and controller server computer 110 may reside in the same computing device. In some embodiments, controller server computer 110 may not be coupled with data pipeline storage unit 111, and may be configured to perform using in memory buffer storage units, such as a cache.

In some embodiments, the source data storage unit and the target data storage unit have significantly different performance characteristics. For example, in one arrangement, the source data storage unit comprises a relational database system capable of fast operation and updating with short response times and low latency with the capability to perform real-time transaction processing, but with specified limitations on table size; the target data storage unit may comprise a data storage system characterized by attributes such as extremely large storage capacity but higher latency that are better suited to analytics operations rather than real-time transaction processing. In one implementation, the source data storage unit implements an ORACLE RDBMS and the target data storage unit implements a HADOOP data store. The particular repository used to implement data pipeline storage unit 111 is not critical and, in some embodiments, it may be implemented using tables in the same RDBMS that is hosted at the source data storage unit 106 or completely eliminated.

Application server computer 105 serves multiple tenants 101a, 101b, 101c. In one approach, the application server computer 105 is owned by, operated by, or associated with an application service provider that provides an online, real-time application program based upon Software as a Service (SAAS) environment that the multiple tenants 101a, 101b, 101c access using client computers coupled over one or more networks to the application server computer. In an embodiment, each of the tenants 101a, 101b, 101c comprises one or more computers associated with a different business enterprise that has a customer relationship with an application service provider that owns or operates the application server computer 105.

Application server computer 105 is coupled to a source data storage unit 106. Application server computer 105 also comprises an application events publisher 215 that is configured to forward application events 120, which may be generated by interactions of tenants 101a, 101b, 101c with the particular application, to the controller server computer 110.

The controller server computer 110 comprises one or more logical units that control and execute updates of target data storage unit 115. Controller server computer 110 is coupled to the data pipeline storage unit 111. Controller server computer 110 comprises a data pipeline manager 112 that is configured to receive application events 120 forwarded by the application events publisher, and stores the application events 120 in the data pipeline storage unit 111. In an embodiment where data pipeline manager 111 is not used, application events may be stored in controller server computer's 110 memory, and processed according to the application events' tenant's update policy.

In an embodiment, the application events 120 forwarded by the events publisher may be non-ordered or essentially random with respect to time of generation and substantive nature or content. That is, if all three tenants 101a, 101b, 101c use the particular application, then the application events publisher 215 may forward the events asynchronously in the order they are generated rather than grouping the application events by tenants. In some embodiments, however, the application events publisher 215 may be configured to group application events by tenants 101a, 101b, 101c before forwarding them to the data pipeline manager 112.

In an embodiment, the data pipeline manager 112 may be configured with an update policy 114a, 114b, 114c corresponding respectively to each of the tenants 101a, 101b, 101c. The particular update policy 114a, 114b, 114c of a particular tenant 101a, 101b, 101c specifies a particular frequency at which an update process for the particular tenant may be initiated or performed. In an embodiment, the data pipeline manager 112 is configured to initiate one or more processes to select data 125 from the data storage unit 106 and store the data 130 in the target data storage unit 115.

Figure 2:
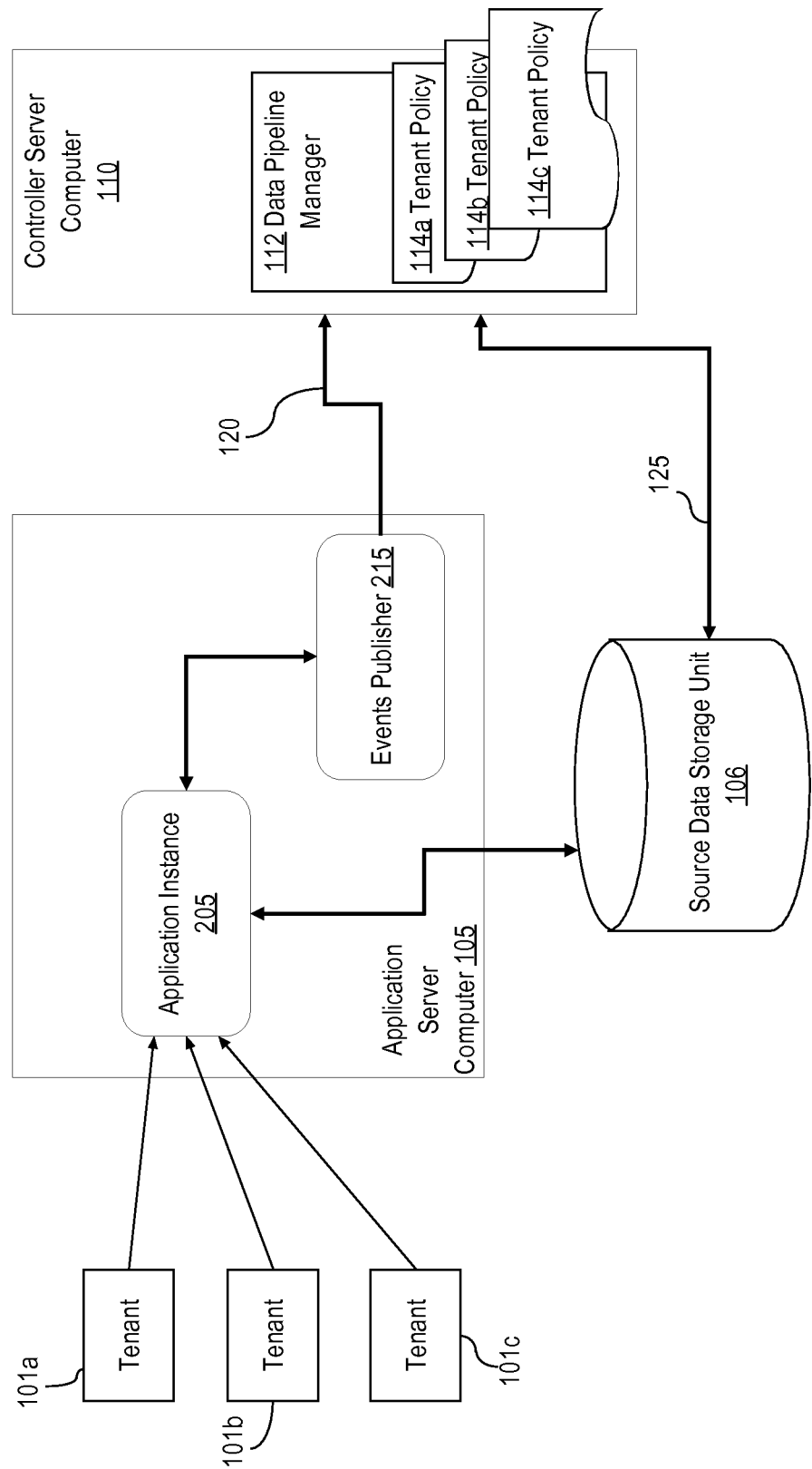
FIG. 2 illustrates an embodiment of an application server coupled to a data storage unit.

FIG. 2 illustrates an embodiment of an application server computer coupled to a source data storage unit. In an embodiment, the application server computer 105 comprises at least one application instance 205 representing an executable version of a particular application program. Tenants 101a, 101b, 101c are capable of connecting to the application instance 205; for example, the application instance may include or may be coupled to an HTTP server and may be configured to serve HTML documents that browser programs at the tenants can receive, render and display.

Application instance 205 also is coupled to the source data storage unit 106. In an embodiment, for purposes of load balancing, the application server computer 105 may comprise multiple application instances and each application instance may be coupled to different a particular data storage unit. Furthermore, for load balancing purposes, tenants 101a, 101b, 101c may be assigned to a particular application instance 205 such that each tenant is always associated with that particular application instance. In an embodiment, each application instance 205 may have a set of unique identifiers that distinguish the particular application instance from other application instances. For example, a set of unique identifiers may be a combination of multiple unique identifiers such as data center identification, environment identification and a tenant identification. In the foregoing example, the environment identifier may indicate whether a tenant is using the application instance in real transactions or for testing purposes, such as testing or trying out a new feature or application service—for example, there may be a "staging" environment identifier and a "production" environment identifier—a data center identification may be an identifier for identifying the particular data center within an application service provider's network or SAAS environment, and a tenant identifier may be a unique identification used to identify a tenant within an application service provider's network or SAAS environment In an embodiment, the set of unique identifiers may be mapped to the particular data storage unit that is coupled with the particular application instance 205. Using the mappings, the data pipeline manager 112 of controller server computer 110 may determine the particular data storage unit that is storing data associated with a particular tenant 101*a*, 101*b*, 101*c* during the update process of the particular tenant.

Application instance 205 is also coupled to events publisher 215. In an embodiment, events publisher 215 is configured to receive application events generated by application instance 205 based upon actions that may be performed by a tenant. In an embodiment, application events generated by application instance 205 are coarse grained events that represent finer grained object events, which in turn represent creation, deletion or modification of data records in source data storage unit 106 that is coupled with application instance 105. In an embodiment, events publisher 215 is configured to include or append a unique tenant identifier, corresponding to a particular tenant 101*a*, 101*b*, 101*c* in or to the application event, so that in subsequent processing the application event may be associated with the particular tenant based on the unique identifier. In an embodiment, the events publisher 215 also may include a particular period identifier in the application event, such that the data pipeline manager 112 may determine a particular time period that is affected by a particular application event. Period may be used as a grouping mechanism to help reduce the amount of data that is to be refreshed. In the context of a business application, a particular period may represent a length of time, such as a particular week, month, or quarter. In an embodiment, the events publisher 215 may also include, in the application event.

In an embodiment, the events publisher 215 may group application events by a particular tenant identifier. The events publisher 215 may order the application events chronologically. In an embodiment, events publisher 215 may be configured to forward the application events to the data pipeline manager 112 in a batch process. In an embodiment, the events publisher 215 may be configured to communicate with the data pipeline manager 112 via a web server and to forward application events via the web server.

Figure 3:
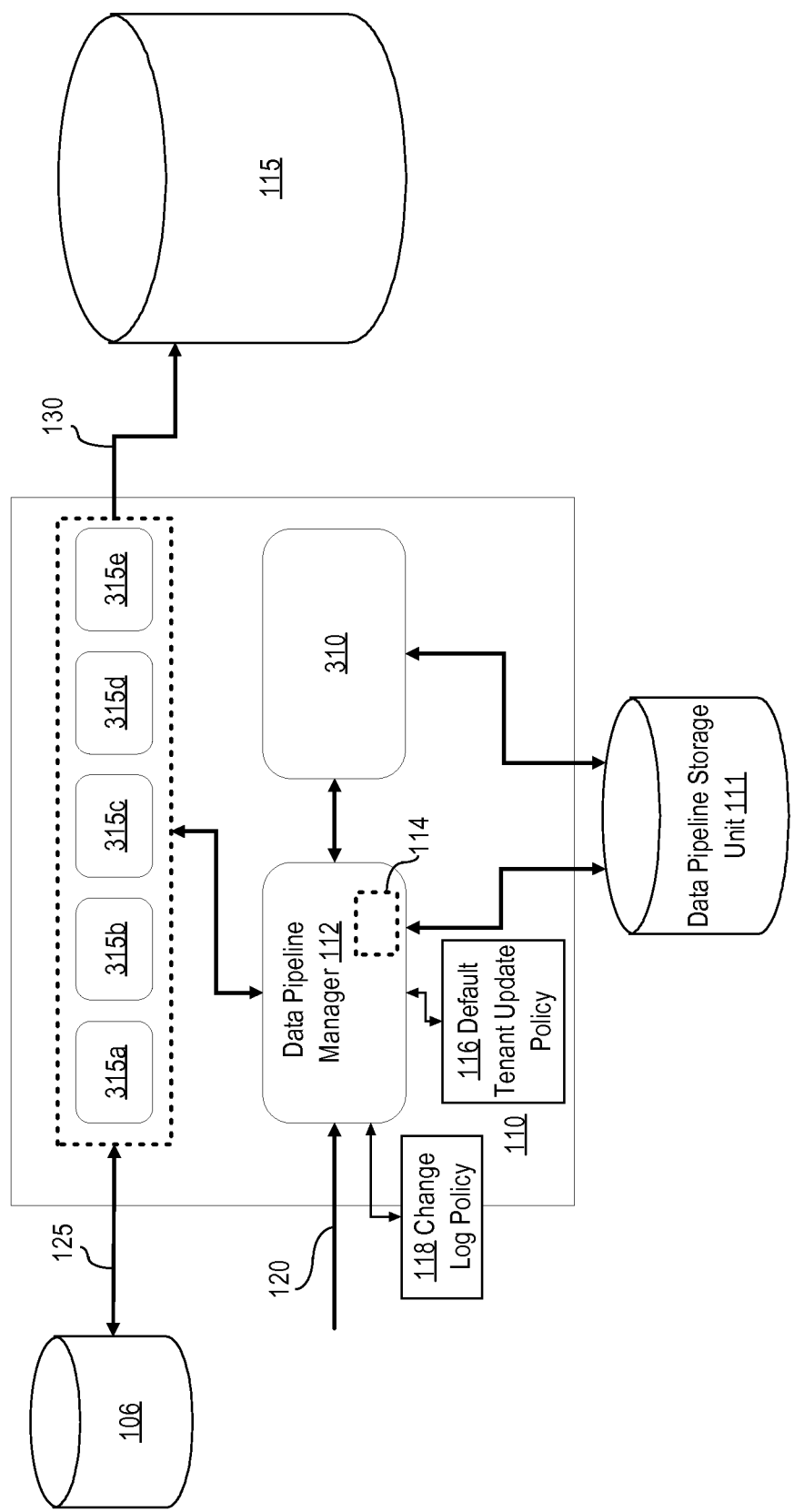
FIG. 3 illustrates an embodiment of a controller server coupled to a data storage unit.

FIG. 3 illustrates an embodiment of a controller server computer coupled to data storage units. As in FIG. 1, FIG. 2, in an embodiment, controller server computer 110 comprises data pipeline manager 112 that is configured to receive application events 120 and is coupled to data pipeline data storage unit 111. As referred to herein, a data storage unit coupled to data pipeline manager is a data pipeline data storage unit. In an embodiment, data pipeline manager 112 is configured to store application events 120 in data pipeline data storage unit 111. In an embodiment, data pipeline manager 112 may be configured to store application events in buffer like memory, such as a cache, and process application events according to the application events' tenant's update policy. In an embodiment, data pipeline manager initially assigns application events 120 to an application event queue, prior to storage in the data pipeline data storage unit 111, to allow the data pipeline manager to more efficiently handle workload affecting the data pipeline data storage unit.

Data pipeline manager 112 may be configured with one or more update policies 114. As in FIG. 1, FIG. 2, each update policy 114 may be associated with a particular tenant. In an embodiment, data pipeline manager 112 may be configured with a default update policy 116, such that the default update policy may be associated with a particular tenant when the particular tenant has not been associated with a particular update policy.

An update policy 114, 116 comprises a set of rules that specify the initiation of an update process for the particular tenant associated with the update policy. In an embodiment, an update policy may specify a particular length of time that should elapse before starting an update process. For example, an update policy may specify a time interval of five (5) minutes to indicate that the update process for the particular tenant is initiated every five (5) minutes. Additionally or alternatively, an update policy may specify an occurrence of a particular number of application events, associated with a particular tenant, which must occur to initiate an update process for the particular tenant. For example, an update policy may specify that 15 application events must occur for a particular tenant; with this approach the update process for that particular tenant is deferred until 15 application events have occurred or have been captured and forwarded to data pipeline manager 112. In an embodiment, an update policy may specify, a particular time length of time that should elapse and a particular number of application events that must occur, in order to initiate an update process.

In an embodiment, an update policy may specify performing an update only when a threshold number of data records or more are affected. For example, the update policy may indicate that if the cumulative number of data records involved in an update at the source device, as indicated by one or more application events, is greater than the threshold number of data records, then an update process for the particular client should be initiated regardless of whether the specified length of time has elapsed or whether the specified number of application events have occurred. For example, an update policy may specify performing an update after a time interval of five (5) minutes, when fifteen (15) or more application events occur, or when 100,000 or more data records are affected. With such a policy, if the particular tenant generates three application events that indicate that a total of 100,000 data records will be affected, then an update process for the particular tenant will be initiated regardless of whether five minutes have elapsed since last update process, or if fifteen (15) application events have occurred since the last update process.

Data pipeline manager 112 is configured to initiate an update process for a particular tenant based on the update policy associated with the particular tenant. The update process may comprise selecting application events associated with the particular tenant from the data pipeline data storage unit 111, selecting data 125 associated with the selected application events application events from the source data storage unit 106, and storing data 130, from the source data storage unit 106, in the target data storage unit 115. In an embodiment, the update process may comprise selecting application events associated with the particular tenant from the data pipeline data storage unit 111, translating the coarse grained application events into finer grained object events, and selecting data 125 associated with the object events from the source data storage unit 106, and storing data 130, from the source data storage unit 106, in the target data storage unit 115. In an embodiment, the translation of coarse grained application events into finer grained object events may be based on a translation policy. As described, herein, a translation policy, may be defined as a set of rules that specify the objects that are affected by a particular application event. For example, if a tenant generated a "calculate" application event by clicking on "Calculate Commission" button on the application interface, then the translation policy may specify that, for a "calculate" application event, a "credits" object (indicating a credit for the order) is affected, and that a "commission" object is affected because a "credits" object is affected, and that a "payments" object is affected because a "commission"

object is affected. Data pipeline manager 112 may then select data associated with "credits", "commission", and "payments" objects of the particular tenant.

In an embodiment, data pipeline manager 112 may be configured to suspend or skip an update process for a particular tenant when the data pipeline manager receives and stores a SUSPEND message indicating that the update process for the particular tenant should be suspended. Data pipeline manager 112 may continue to skip the update process for the particular tenant until the data pipeline manager receives a RESUME message indicating that the update process for the particular tenant may be resumed. In response to a RESUME message, the data pipeline manager 112 may initiate the update process based on the update policy associated with the particular tenant.

In an embodiment, the data pipeline manager 112 may identify application events associated with a particular tenant and determine whether certain application events may be discarded based on a change log policy 118. In this context, a change log policy may be a set of rules that defines how the data pipeline manager 112 can determine whether to store data associated with a particular application event in the target data storage unit 111. For example, three (3) application events associated with a particular tenant might be received at the data pipeline manager 112. The first application event reflects creating a new data record in the source data storage unit 106 for the particular tenant, the second application event indicates modifying the particular data record and the third application event specifies deleting the particular data record. The change log policy 118 might specify that if a particular application event deletes the data record associated with application events that occurred chronologically prior to the particular application event then the particular data record is not stored in the target data storage unit 111. Therefore, the data pipeline manager 112, in this example, may disregard all three (3) application events and does not select any data associated with the three (3) application events from the source data storage unit 106 and does not store data in target data storage unit 115 for this particular tenant. Thus, based on change log policy 118, the data pipeline manager 112 is able to more efficiently manage its resources and limit the number of read/write operations with data storage units.

In an embodiment, data pipeline manager 112 may be configured to create and maintain a change log file. In a change log file, a data pipeline manager may record the application events that are being translated into object events. In some embodiments, a particular change log file may be maintained for each object configured within an application instance or service. For example, an application service may be configured with four objects, "credits", "commission", "payment", and "bonus". A data pipeline manager may be configured to create and maintain a separate change log file for each of the four objects. A particular change log file may also be maintained for each tenant of the application service provider. In an embodiment, a particular change log for each object may be maintained for each tenant. In an embodiment, a change log file may be used to re-process application events anytime an error, such as system crash or write failure, occurs.

In an embodiment, the data pipeline manager 112 may communicate with a data pipeline process controller 310 to determine a particular job comprising one or more tasks corresponding to the selection of data from the source data storage unit 106 and storing the data in target data storage unit 115. Each job is associated with a particular tenant for which the update process has been initiated. In an embodiment, the data pipeline manager 112 is configured to select a particular job determined by the data pipeline process controller 310 and distribute the one or more tasks associated with the particular job among individual processes at task nodes 315a, 315b, 315c, 315d, 315e in the controller server computer 110. In an embodiment, each of the task nodes 315a, 315b, 315c, 315d, 315e is associated with a particular application event and is configured to select the data that is associated with the particular application event from source data storage unit 106 and store that data at target data storage unit 115.

Task nodes 315a, 315b, 315c, 315d, 315e may be configured with certain identifiers that allow the data pipeline manager 112 to restart a particular task node when the particular task node fails. For example, the particular failed task node may be associated with a task for particular tenant and configured with the tenant identifier of the particular tenant. Furthermore, the particular failed task node may also be configured with a period identifier and other data record identifiers that identify a particular data record in the source data storage unit 106.

In an embodiment, the data pipeline data storage unit 111 may store certain metadata related to the data pipeline manager 112 that enable the data pipeline manager to perform certain resource management services such as monitoring progression of various tasks and jobs. In an embodiment, the data pipeline manager 112 is configured to determine a number of incomplete tasks based on a task queue comprising all incomplete tasks, and to instantiate new task nodes based on task configuration data if the number of incomplete tasks exceeds a specified threshold value. The specified threshold may indicate that the number of available task nodes is insufficient to process the number of incomplete tasks within a desired period of time. The data pipeline manager 112 may associate the new task processes with a particular job and a task from the task queue.

In some embodiments, each tenant is associated with a particular task queue, comprising tasks associated with the particular tenant, and a particular task manager is configured to monitor task queues and distribute the particular task from the particular task queue to an available task node. In some embodiments, the task manager may be further configured to instantiate new task nodes when the number of tasks in a particular queue exceeds a specified threshold value that is configured to ensure that no one tenant utilizes all available task nodes and no one tenant is penalized as a cost for accommodating a higher priority tenant.

Figure 4:
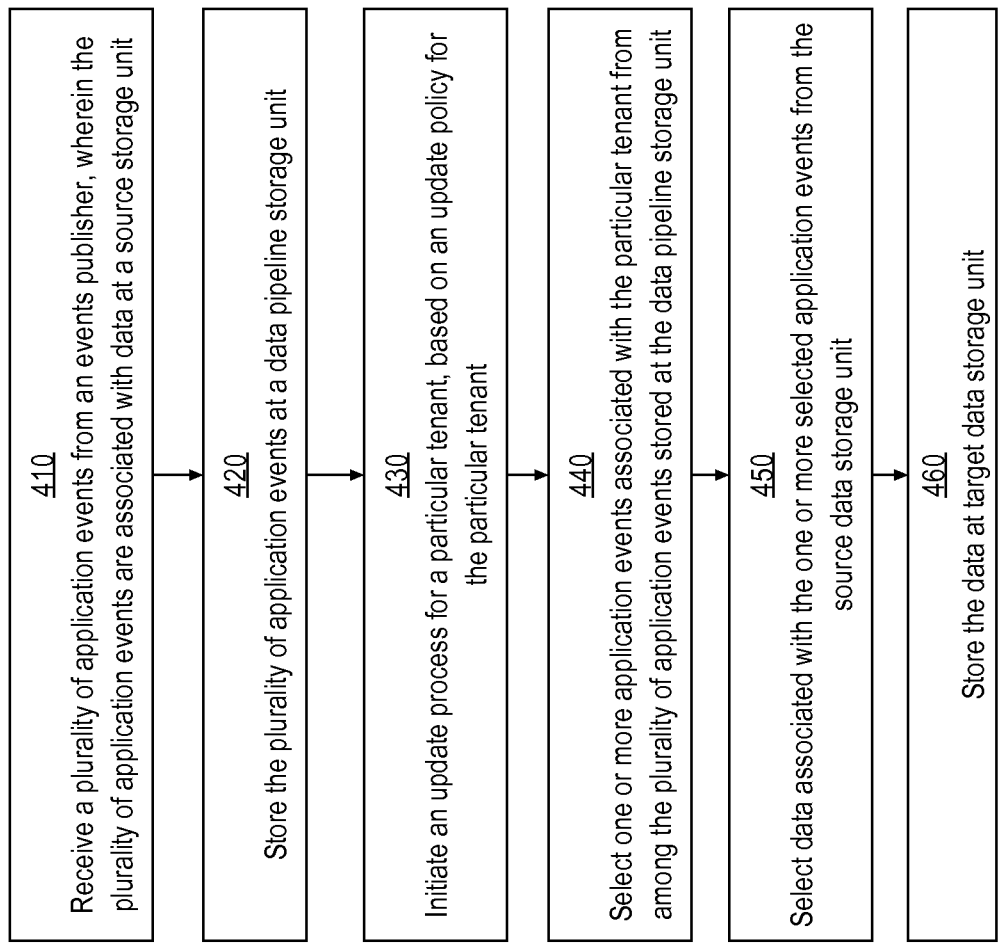
FIG. 4 illustrates a method of updating a data storage unit using per-tenant policies

3.0 Method of Updating a Data Storage Unit Using Tenant Specific Update Policies FIG. 4 illustrates an example method for updating a target data storage unit with data from a source data storage unit using per tenant update policies. In an embodiment, the operations described for FIG. 4 may be performed by the data pipeline manager 112 of FIG. 1, FIG. 2, FIG. 3, but other embodiments may implement the same functions in other contexts using other computing devices.

In step 410 a plurality of application events are received from an events publisher. For example, the data pipeline manager 112 receives application events from an instance of an application program; typically the application events relate to functions of the application as opposed to indications about computing infrastructure or networking infrastructure. As part of step 410 or a related operation, the plurality of application events is associated with data at a source data storage unit.

In an embodiment, the plurality of application events may be received at an application events queue that is configured to communicate with the data pipeline manager 112 when an application event is received at the application events queue. In an embodiment, the source data storage unit may be coupled to an instance of an application from which one or more application events, among the plurality of application events, have been generated. In an embodiment, the plurality of application events may have been generated from multiple instances of the application, and each instance of the application may be coupled with a particular data storage unit. In this embodiment, each application event may comprise identifiers identifying the data storage unit that is storing data associated with the particular application event.

In step 420, the application events are stored at a data pipeline data storage unit. In an embodiment, the data pipeline data storage unit is coupled with the data pipeline manager and the data pipeline data storage unit may also store metadata corresponding to various processes being performed by the data pipeline manager.

In step 430, an update process for a particular tenant is initiated, based on an update policy for the particular tenant. The tenant, as described for other examples in connection with FIG. 1, FIG. 2, FIG. 3, typically comprises a computer that is coupled over a network to an application server computer that hosts the application and interacts with the application to perform business functions. Typically tenants are different business enterprises. In an embodiment, all tenants may initially be associated with a default update policy, and the default update policy for a particular tenant may be redefined to determine a tenant specific update policy.

In step 440, one or more application events associated with the particular tenant are selected from among the plurality of application events stored at the second data storage unit. In an embodiment, prior to selecting the one or more application events, a particular set of application events, associated with the particular tenant, may be identified from among the plurality of application events stored at the data pipeline data storage unit. From the particular set of application events, one or more application events eligible for discarding are identified based on a change log policy. The events eligible for discarding may be application events that would have no net effect on data in the target data storage unit. Therefore, the data pipeline manager may only perform a read or select operation on source data storage unit and a write or copy operation on the target data storage unit for only the data records associated with application events that would have a net effect on data in the target data storage unit. Thus, the presence of a data pipeline manager, as described above, allows for an intelligent determination of whether a read and a corresponding write should occur, which may cause a slight delay in updating target data storage unit. However, any potential inefficiency caused by the slight delay is overcome by the efficiency of reducing the number of read and write operations, thereby gaining efficiency. In this embodiment, the one or more application events selected in step 440 are then selected from the particular set of application events other than the application events that are eligible for discarding.

In step 450, data associated with the one or more selected application events is selected from source data storage unit.

In step 460, data selected from source data storage unit is stored at the target data storage unit. In an embodiment, the source data storage unit and the target data storage unit may be units of the same data storage device. In an embodiment, the one or more selected application events may be deleted from the data pipeline data storage unit. In an embodiment, for a particular tenant, data associated with the particular tenant at the target data storage unit combined with the data associated with the one or more application events, associated with the particular tenant from among the plurality of application events, is equivalent to current data associated with the particular tenant at the source data storage unit. Therefore, the data, per tenant, is consistent as between the source data storage unit and target data storage unit at all relevant points in time.

In some embodiments, the source data storage unit and the target data storage unit may have significantly different performance characteristics. For example, in one arrangement, the source data storage unit comprises a relational database system capable of fast operation and updating with short response times and low latency with the capability to perform real-time transaction processing, but with specified limitations on table size; the second data storage unit may comprise a data storage system characterized by attributes such as extremely large storage capacity but higher latency that are better suited to analytics operations rather than real-time transaction processing. In one implementation, the source data storage unit implements an ORACLE RDBMS and the target data storage unit implements a HADOOP data store. In another implementation, the source data storage unit implements the HADOOP data store and the target data storage unit implements an RDBMS.

The embodiments described herein may enable an application service provider to achieve fine-grained control over when data for a particular tenant in the target data storage unit is updated, and may determine the frequency of update processes based upon various factors such as how frequently a particular tenant uses the particular application hosted by the application service provider, or how important a particular tenant may be for the application service provider. Such fine-grained control may enable the application service provider to ensure that data entered by a particular tenant is available for future operations in near real-time. In particular, the approaches herein can be used to effectively update a target data storage unit that is optimized for analytics functions based upon a source data storage unit that is optimized for real-time transaction processing in a manner that is efficient for all tenants in a multi-tenant application service provider system. Definition of different tenant update policies enables efficient updating of the target data storage unit for tenants that perform large-volume updates to the source data storage unit without starving the availability of resources to update the target data storage unit for other tenants who may perform relatively fewer updates to the source data storage unit. Additionally, unnecessary data read and write operations may be eliminated, thereby further improving efficiency in updating a target data storage unit. The approaches described herein also allow for data of each tenant to be consistently preserved across two data storage units by always ensuring that data of the particular tenant in the target data storage unit combined with data represented by the application events of the particular tenant in the data pipeline controller will be equivalent to data of the particular tenant in the source data storage unit.

In some embodiments, the approaches herein support near real-time data movement from the source data storage unit to a target data storage unit and ensure consistency between the source data storage unit and target data storage unit using intelligent application-specific filters and refresh-update policies in a multi-tenant SaaS environment.

Coarse-grain application events are generated from the source system and handled in a secondary system in the form of a data pipeline manager. The events are translated into fine-grained events and merged to provide for processing high-volume changes to increase efficiency in a multi-tenant SaaS environment.

Embodiments may provide efficient filtering based upon time dimensions to reduce unnecessary movement of application data. For example, transfer of application data may be based upon a time dimension so that only recently changed data is moved to minimize the volume of data transfer.

Refresh policies may vary per tenant, and may vary based upon customer-specific requirements in terms of frequency of the number of application events that trigger a refresh, in a multi-tenant SaaS environment.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
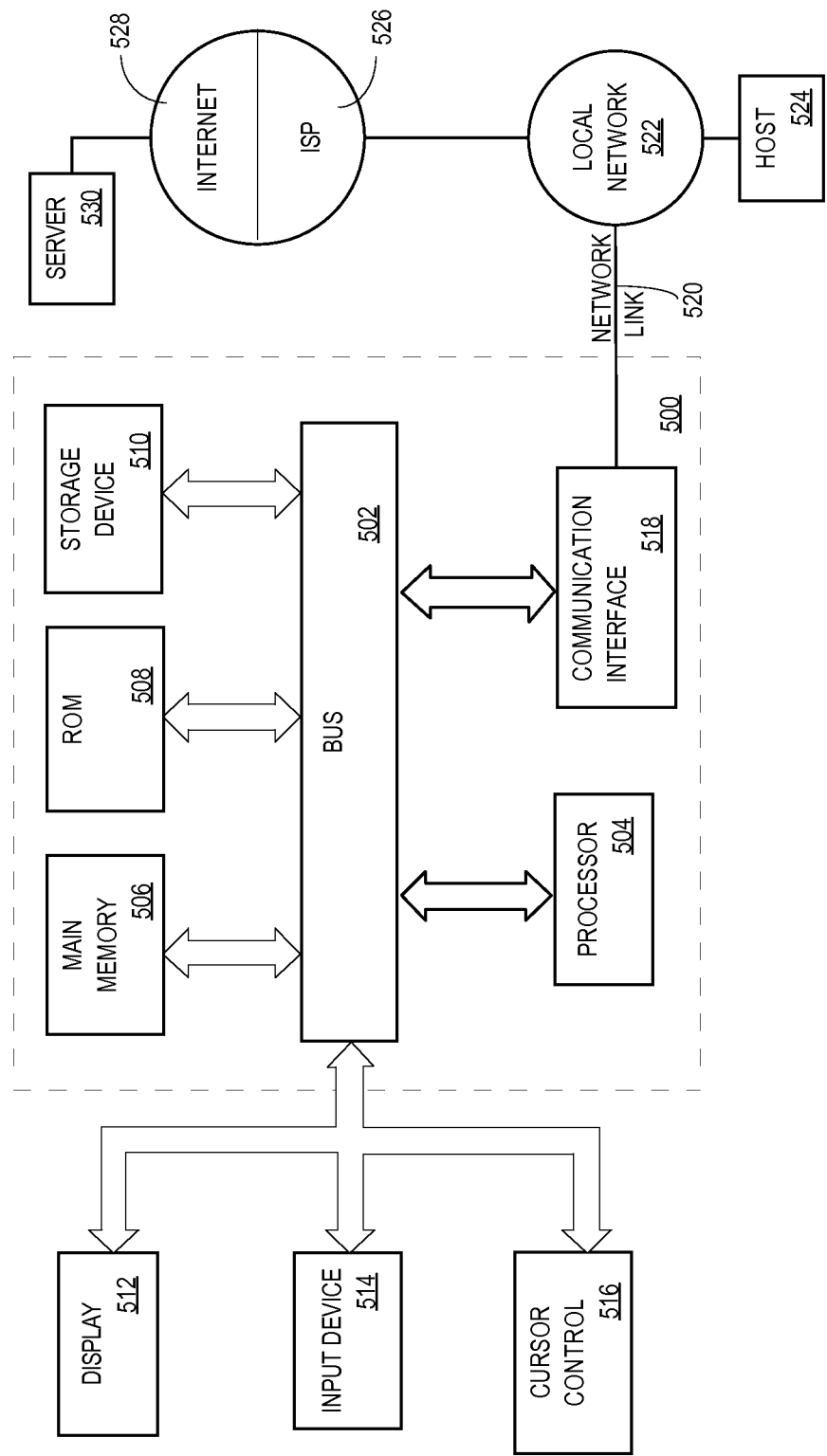
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of improving accessibility and consistent preservation of data comprising:

using a controller server computer, receiving a plurality of application events from an application events publisher of an application program hosted using an application server computer of a multi-tenant application service provider, wherein each application event of the plurality of application events indicates a tenant identifier and that data records were created, modified, or deleted by the application program in a source data storage unit;

using the controller server computer, storing the plurality of application events at a data pipeline data storage unit;

using the controller server computer, determining whether a previous update process for a particular tenant is in progression;

using the controller server computer, in response to determining that the previous update process for the particular tenant is not in progression, determining to initiate an update process for the particular tenant based on satisfying an update frequency threshold in an update policy indicated by a tenant identifier of the particular tenant, wherein the update process comprises:

selecting, based on the tenant identifier of the particular tenant and on the update policy indicated by the tenant identifier of the particular tenant, using the controller server computer, one or more application events of the particular tenant from among the plurality of application events stored at the data pipeline data storage unit;

wherein the one or more selected application events have been automatically generated in response to performing one or more requested actions of the particular tenant in the application program that cause the application program to create, modify or delete one or more data records of the data records in the source data storage unit;

using the controller server computer, selecting data from the one or more data records indicated by the one or more selected application events, from the source data storage unit;

using the controller server computer, storing the data at a target data storage unit;

wherein, for the particular tenant, after storing the data from the one or more data records indicated by the one or more selected application events in the target data storage unit, data of the particular tenant at the target data storage unit is consistent with data of the particular tenant at the source data storage unit;

wherein the method is performed using one or more computing devices.

2. The method of claim 1, further comprising:

creating a particular job for the particular tenant, comprising, a plurality of tasks including a task for each of the one or more selected application events associated with the particular tenant;

adding the plurality of tasks to a particular task queue associated with the particular job;

distributing the plurality of tasks amongst a plurality of task processes, wherein the plurality of task processes are configured to select the data associated with the one or more selected application events from the source data storage unit and store the data in the target data storage unit.

3. The method of claim 2, further comprising:

determining a size of the particular task queue;

in response to determining that a number of entries in the particular task queue is greater than a task queue size threshold value, instantiating, based on a task process configuration file, a particular task process;

associating the particular task process with the particular task queue and the particular job identified by the task queue.

4. The method of claim 1, wherein the update policy associated with the particular tenant specifies a minimum frequency indicating the update frequency threshold at which the update process is to occur.

5. The method of claim 1, wherein the update policy specifies that initiation of the update process for the particular tenant is triggered by the update frequency threshold indicating an occurrence of a particular amount of application events since a prior update process.

6. The method of claim 1, wherein the update policy specifies starting the update process for the particular tenant in response to the satisfying of the update frequency threshold by determining that one or more application events cumulatively affect a threshold number of data records.

17

7. The method of claim 1, wherein the update policy specifies starting the update process for the particular tenant in response to the satisfying of the update frequency threshold by detecting a particular number of application events and a particular length of time since the previous update process.

8. The method of claim 1, further comprising:
deleting, the one or more selected application events, from the data pipeline data storage unit, after storing the data at the target data storage unit.

9. The method of claim 1, the update process comprising:
determining that the one or more selected application events represent high volume incremental updates of records associated with a particular time period;
partitioning and replacing, in the target data storage unit, all records of the particular time period based in part upon the one or more selected application events, and not scanning an entire file of the target data storage unit to update only those records that are affected by the one or more selected application events.

10. A computer system comprising:
a plurality of task nodes having network interfaces configured to couple to a source data storage unit and to a target data storage unit;
a controller server computer having a data pipeline manager coupled to the plurality of task nodes and to a data pipeline storage unit;
one or more processors;
one or more non-transitory computer-readable data storage media storing instructions which, when executed using the one or more processors, cause performing:
receiving a plurality of application events from an application events publisher of an application program hosted using an application server computer of a multi-tenant application service provider, wherein each application event of the plurality of application indicates a tenant identifier and that data records were created, modified, or deleted in the source data storage unit;
storing the plurality of application events at a data pipeline data storage unit;
determining whether a previous update process for a particular tenant is in progression;
in response to determining that the previous update process for the particular tenant is not in progression, determining to initiate an update process for the particular tenant based on satisfying an update frequency threshold in an update policy indicated by a tenant identifier of the particular tenant, wherein the update process comprises:
selecting, based on the tenant identifier of the particular tenant and on the update policy indicated by the tenant identifier of the particular tenant, one or more application events of the particular tenant from among the plurality of application events stored at the data pipeline data storage unit;
wherein the one or more selected application events have been automatically generated in response to performing one or more requested actions of the particular tenant in the application program that cause the application program to create, modify or delete one or more data records of the data records in the source data storage unit;
selecting data from the one or more data records indicated by the one or more selected application events, from the source data storage unit;
storing the data at the target data storage unit;

18 wherein, for the particular tenant, after storing the data from the one or more data records indicated by the one or more selected application events in the target data storage unit, data of the particular tenant at the target data storage unit is consistent with data of the particular tenant at the source data storage unit.

11. The computer system of claim 10, comprising instructions which when executed cause performing:
creating a particular job for the particular tenant, comprising, a plurality of tasks including a task for each of the one or more selected application events associated with the particular tenant;
adding the plurality of tasks to a particular task queue associated with the particular job;
distributing the plurality of tasks amongst a plurality of task processes, wherein the plurality of task processes are configured to select the data associated with the one or more selected application events from the source data storage unit and store the data in the target data storage unit.

12. The computer system of claim 11, comprising instructions which when executed cause performing:
determining a size of the particular task queue;
in response to determining that a number of entries in the particular task queue is greater than a task queue size threshold value, instantiating, based on a task process configuration file, a particular task process;
associating the particular task process with the particular task queue and the particular job identified by the task queue.

13. The computer system of claim 10, wherein the update policy associated with the particular tenant specifies a minimum frequency indicating the update frequency threshold at which the update process is to occur.

14. The computer system of claim 10, wherein the update policy specifies that initiation of the update process for the particular tenant is triggered by the update frequency threshold indicating an occurrence of a particular amount of application events since a prior update process.

15. The computer system of claim 10, wherein the update policy specifies starting the update process for the particular tenant in response to the satisfying of the update frequency threshold by determining that one or more application events cumulatively affect a threshold number of data records.

16. The computer system of claim 10, wherein the update policy specifies starting the update process for the particular tenant in response to the satisfying of the update frequency threshold by detecting a particular number of application events and a particular length of time since the previous update process.

17. The computer system of claim 10, comprising instructions which when executed cause deleting the one or more selected application events from the data pipeline data storage unit, after storing the data at the target data storage unit.

18. The computer system of claim 10, comprising instructions which when executed cause performing:
determining that the one or more selected application events represent high volume incremental updates of records associated with a particular time period;
replacing, in the target data storage unit, all records of the particular time period based in part upon the one or more selected application events, and not scanning an entire file of the target data storage unit to update only those records that are affected by the one or more selected application events.

\* \* \* \* \*